(12) United States Patent
Katagiyama et al.

(10) Patent No.: US 8,348,518 B2
(45) Date of Patent: Jan. 8, 2013

(54) OPTICAL CONNECTOR

(75) Inventors: Naoki Katagiyama, Tokyo (JP); Hideto Shimazu, Tokyo (JP); Yuichi Koreeda, Tokyo (JP); Takeo Toda, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 266 days.

(21) Appl. No.: 12/726,433

(22) Filed: Mar. 18, 2010

(65) Prior Publication Data
US 2010/0239213 A1    Sep. 23, 2010

(30) Foreign Application Priority Data

Mar. 18, 2009    (JP) .................................. 2009-066121

(51) Int. Cl.
*G02B 6/38* (2006.01)
(52) U.S. Cl. ......................................................... 385/60

(58) Field of Classification Search ........................ None
See application file for complete search history.

(56) References Cited

U.S. PATENT DOCUMENTS
7,942,590 B2 *    5/2011    Lu et al. .......................... 385/78

FOREIGN PATENT DOCUMENTS
JP          10-311933 A      11/1998

* cited by examiner

*Primary Examiner* — Sung Pak
(74) *Attorney, Agent, or Firm* — Holtz, Holtz, Goodman & Chick, PC

(57) ABSTRACT

An optical connector in which a seal member is difficult to be damaged during assembly. A seal member-accommodating portion that accommodates the seal member in a compressed state is formed as an intermediate portion of a through hole of a housing. When an insertion member is inserted into the through hole, an insertion portion of the insertion member presses the seal member into the seal member-accommodating portion.

4 Claims, 18 Drawing Sheets

OPTICAL CONNECTOR

BACKGROUND OF THE INVENTION

1. Field of the Invention

This invention relates to an optical connector, and more particularly to an optical connector having waterproof properties.

2. Description of Related Art

Conventionally, there has been proposed an optical connector comprising a shell member, an insulator, ferrules, sealing members, and fiber holding members (see Japanese Laid-Open Patent Publication (Kokai) No. H10-311933, Paragraph Nos. 0016 to 0022 and FIG. 1).

The shell member has a substantially hollow cylindrical shape and has a flange-shaped shell-holding portion formed on an outer peripheral surface thereof. A protrusion is formed on an inner peripheral surface of a front end portion of the shell member, and a groove is formed in an inner peripheral surface of a rear end portion of the shell member along a circumferential direction thereof. A stopper member is removably mounted on the groove.

The insulator has a substantially hollow cylindrical shape, and is inserted into the shell member to be fixed by the protrusion of the shell member and the stopper member. The insulator is formed with a through hole. The through hole extends in a fitting/removing direction of the optical connector with respect to a mating optical connector. A female screw is formed on an inner peripheral surface of a rear end portion of the through hole. An inner diameter of a front end portion of the through hole is smaller than inner diameters of the other portions of the through hole, and the inner diameters of the other portions of the through hole are substantially equal to each other.

The ferrule has a substantially hollow cylindrical shape and holds an optical fiber strand of one end portion of an optical fiber code. The ferrule includes a flange-shaped ferrule-holding portion.

The ferrule is inserted into the through hole of the insulator. A front end portion of the ferrule protrudes from the front portion of the through hole. The ferrule-holding portion of the ferrule is brought into abutment with a stepped surface (stepped surface that is adjacent to a rear of the front end portion of the through hole) in the through hole of the insulator.

The sealing member is formed of an elastic material such that it has a substantially annular shape, and is mounted on a rear end portion of the ferrule. The sealing member prevents water from passing through the through hole.

The fiber-holding member has a substantially hollow cylindrical shape and includes a fiber through hole. The optical fiber code is passed through the fiber through hole. Also, the rear end portion of the ferrule is inserted into a front end portion of the fiber through hole. A male screw that is screwed into the female screw of the insulator is formed on an outer peripheral surface of a rear end portion of the fiber-holding member.

Next, a description will be given of assembly of the conventional optical connector.

As a preparation for the assembly, the optical fiber code is passed through the fiber-holding member and the ferrule having the sealing member mounted thereon is caused to hold the optical fiber strand of the one end portion of the optical fiber code, in advance.

First, the insulator is inserted into the shell member until the insulator is brought into abutment with the protrusion of the shell member.

When the insulator is brought into abutment with the protrusion of the shell member, the stopper member is mounted in the groove of the shell member to fix the insulator to the shell member.

Next, the ferrule having the sealing member mounted thereon is inserted into the through hole of the insulator and is pushed in to the front end portion of the through hole by using e.g. a jig. When the ferrule is pushed in, the front end portion of the ferrule protrudes forward from the through hole.

Finally, the fiber-holding member is inserted into the through hole of the insulator, and the male screw of the fiber-holding member is screwed into the female screw of the insulator, whereby the sealing member is pressed to the ferrule-holding portion of the ferrule with a front end of the fiber-holding member.

When through the above-described process, the assembly of the optical connector is completed.

In the above-described optical connector, when the ferrule having the sealing member mounted thereon is inserted into the through hole of the insulator and is pressed in to the front end portion of the through hole by using e.g. a jig, the sealing member is moved while being rubbed against the inner peripheral surface (especially the female screw portion) of the through hole. Therefore, there is a fear that the sealing member is damaged. As a result, there is a fear that the optical connector cannot be made waterproof.

SUMMARY OF THE INVENTION

The present invention has been made in view of these circumstances, and an object thereof is to provide an optical connector having a seal member which is difficult to be damaged during assembly.

To attain the above object, the present invention provides an optical connector comprising a housing including a through hole, an insertion member that is inserted into the through hole, a holding member that holds an optical fiber and is accommodated in the through hole, and a seal member that is mounted on an outer peripheral surface of the holding member and prevents fluid from passing through the through hole, the through hole of the housing including a seal member-accommodating portion formed as an intermediate portion thereof for accommodating the seal member in a compressed state, the insertion member being provided with a pressing portion that presses the seal member into the seal member-accommodating portion when the insertion member is inserted into the through hole.

With the arrangement of the optical connector according to the present invention, when the seal member is pressed into the seal member-accommodating portion as an intermediate portion of the through hole by the pressing portion of the insertion member inserted into the through hole of the housing, the seal member is compressed, and by a restoring force thereof, the seal member is pressed onto an inner peripheral surface of the seal member-accommodating portion and onto an outer peripheral surface of the holding portion, whereby a high sealing force is generated. Also, it is not until the seal member is pressed into the seal member-accommodating portion as the intermediate portion of the through hole of the housing that the seal member is brought into contact with an inner peripheral surface of the through hole. In other words, the seal member is not brought into contact with the inner peripheral surface of the through hole until the seal member is pressed into the seal member-accommodating portion.

Preferably, the holding member comprises a ferrule for holding the optical fiber, and a flange member that is mounted on an insertion member-side end portion of the ferrule and includes a flange portion for receiving the seal member when the insertion member is inserted into the through hole, and at least one recess is formed in an outer peripheral surface of the flange portion, and a protruding portion that is capable of fitting to the recess is formed on an inner peripheral surface of the through hole of the housing.

Preferably, the insertion member includes an operating portion that protrudes outside from the through hole when the insertion member is inserted into the through hole.

According to this invention, the seal member is difficult to be damaged during assembly of the optical connector.

The above and other objects, features and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
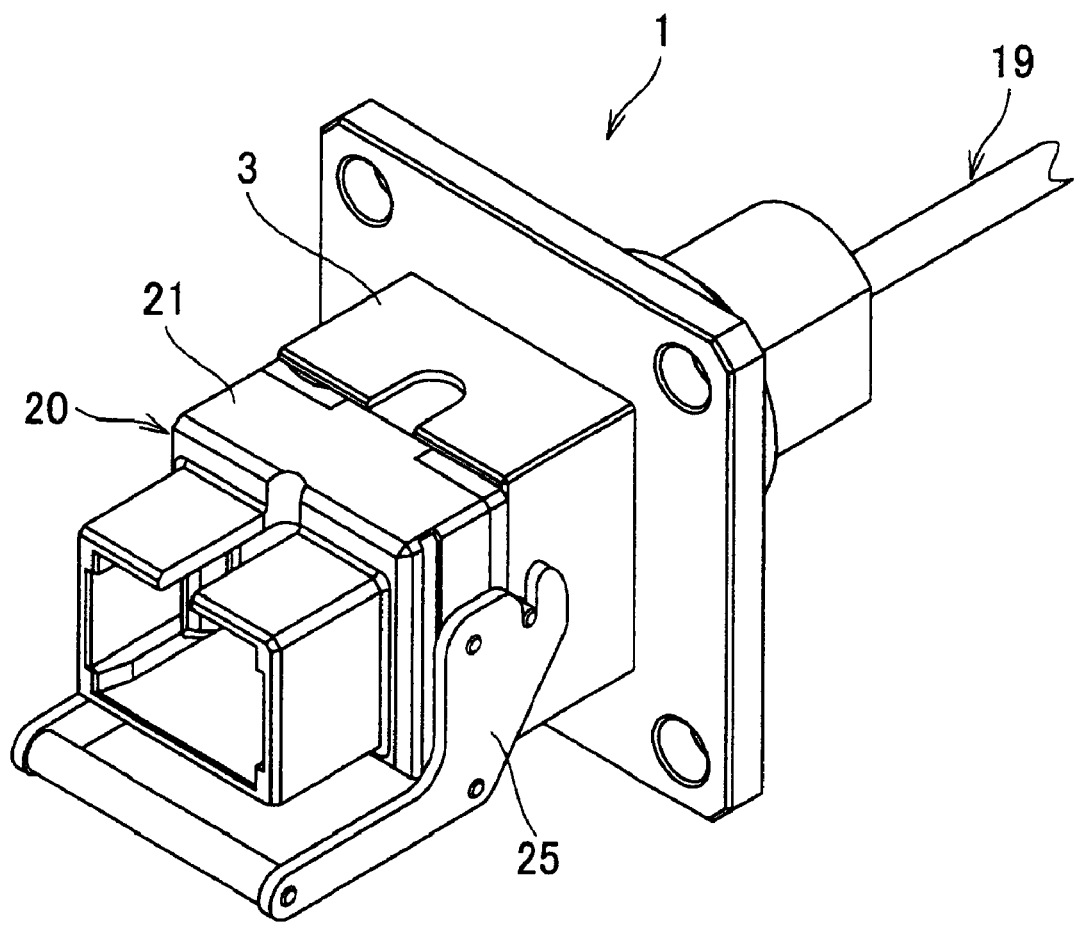
FIG. 1 is a perspective view of an optical connector and an optical adapter according to an embodiment of the present invention in a state in which the optical connector and the optical adapter are fitted to each other.

As shown in FIG. 1, an optical connector 1 is used in combination with an optical adapter 20.

Figure 2:
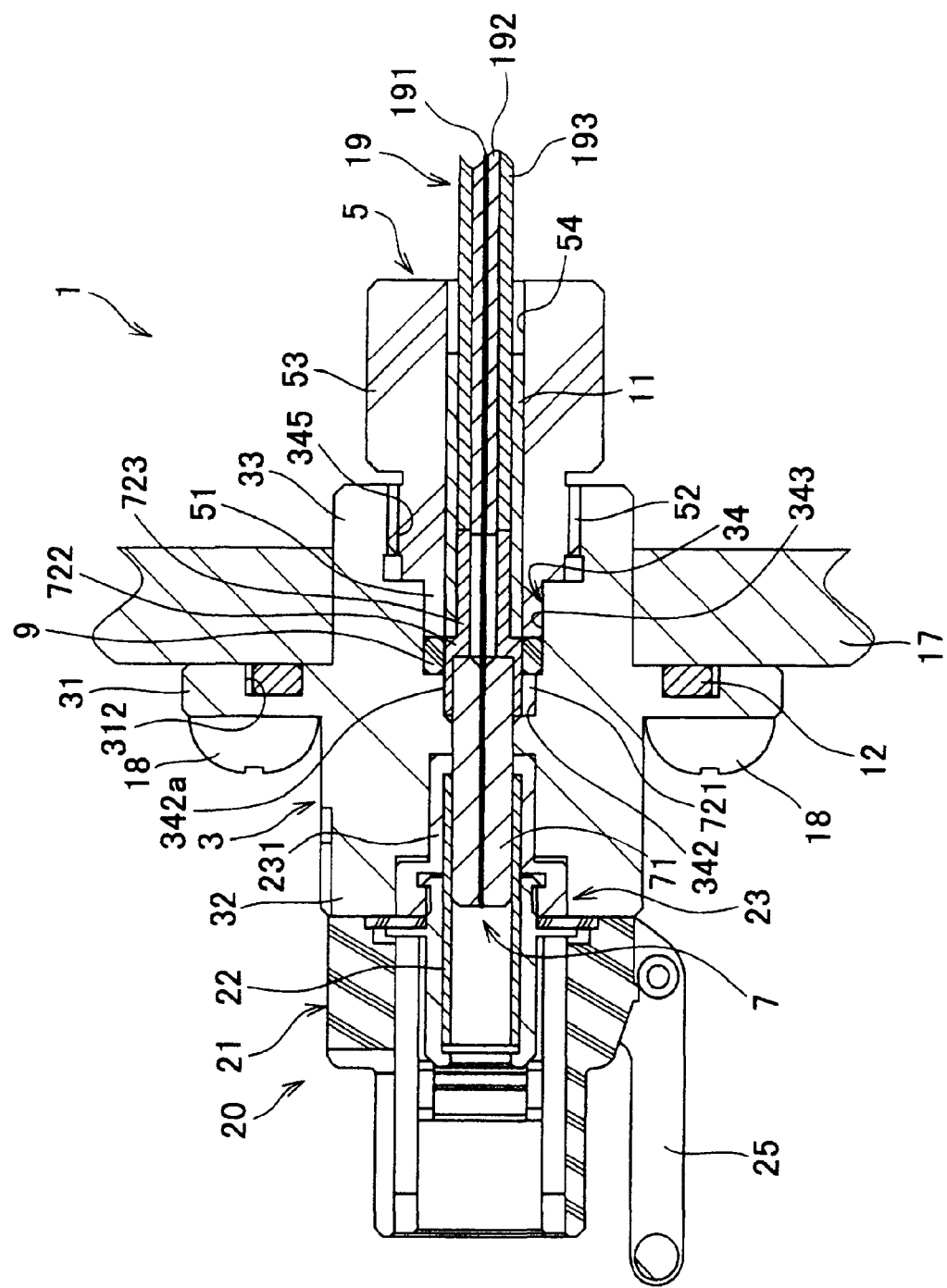
FIG. 2 is a cross-sectional view of the optical connector and the optical adapter shown in FIG. 1.
Figure 3:
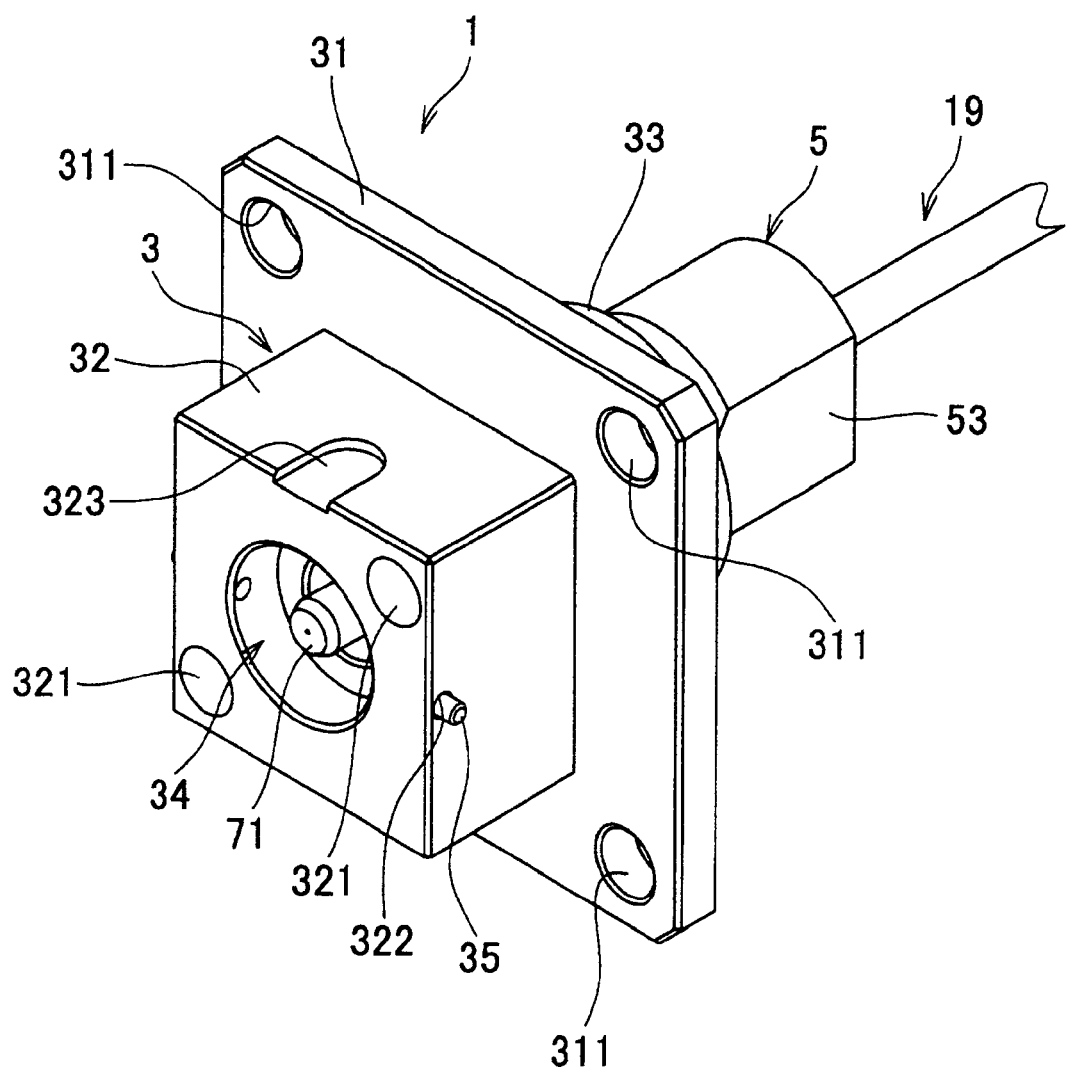
FIG. 3 is a perspective view of the optical connector shown in FIG. 1.

As shown in FIGS. 2 and 3, the optical connector 1 is comprised of a housing 3, an insertion member 5, a holding member 7, a seal member 9, a sleeve 11, and a seal member 12. The optical connector 1 is connected to an optical fiber code 19 and is fixed to a panel 17. The optical fiber code 19 is comprised of an optical fiber strand 191 composed of an optical fiber formed of a fiber-shaped core and a clad covering the core, none of which are shown, and a primary coating covering the optical fiber, a secondary coating 192 covering the optical fiber strand 191, and an outer sheath 193 covering the secondary coating 192.

Figure 4:
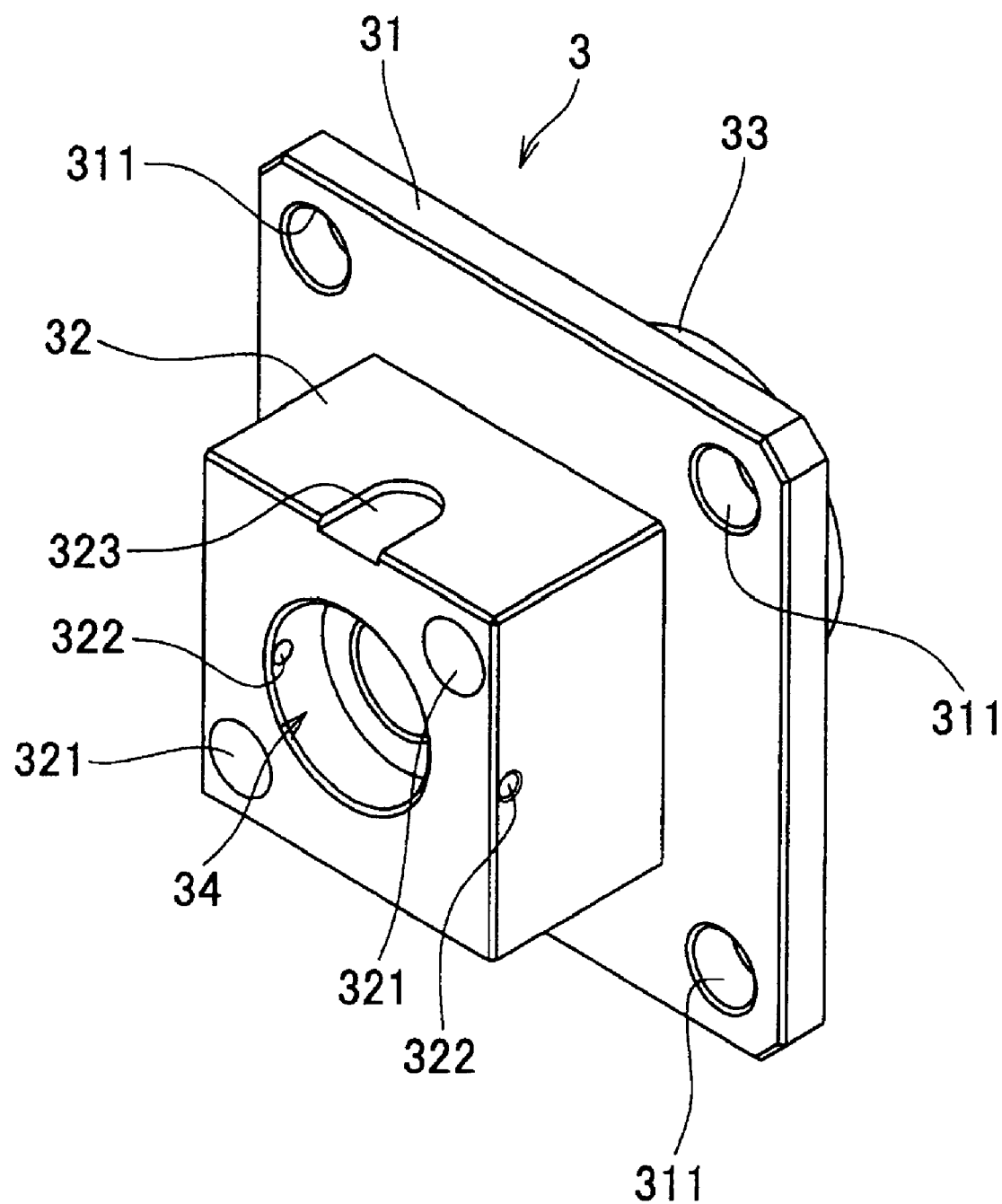
FIG. 4 is a perspective view of a housing of the optical connector shown in FIG. 1.
Figure 5:
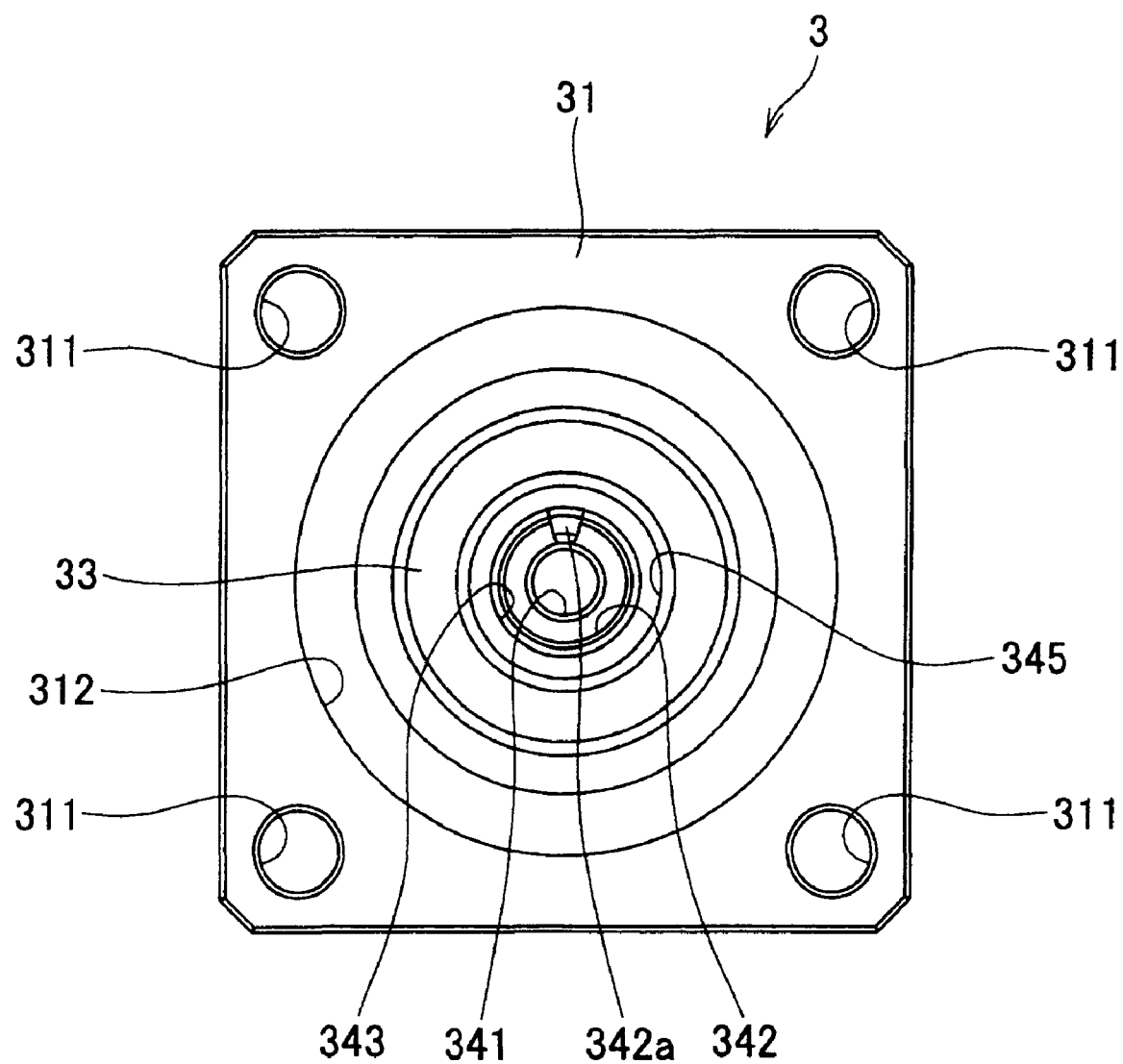
FIG. 5 is a rear view of the housing shown in FIG. 4.
Figure 6:
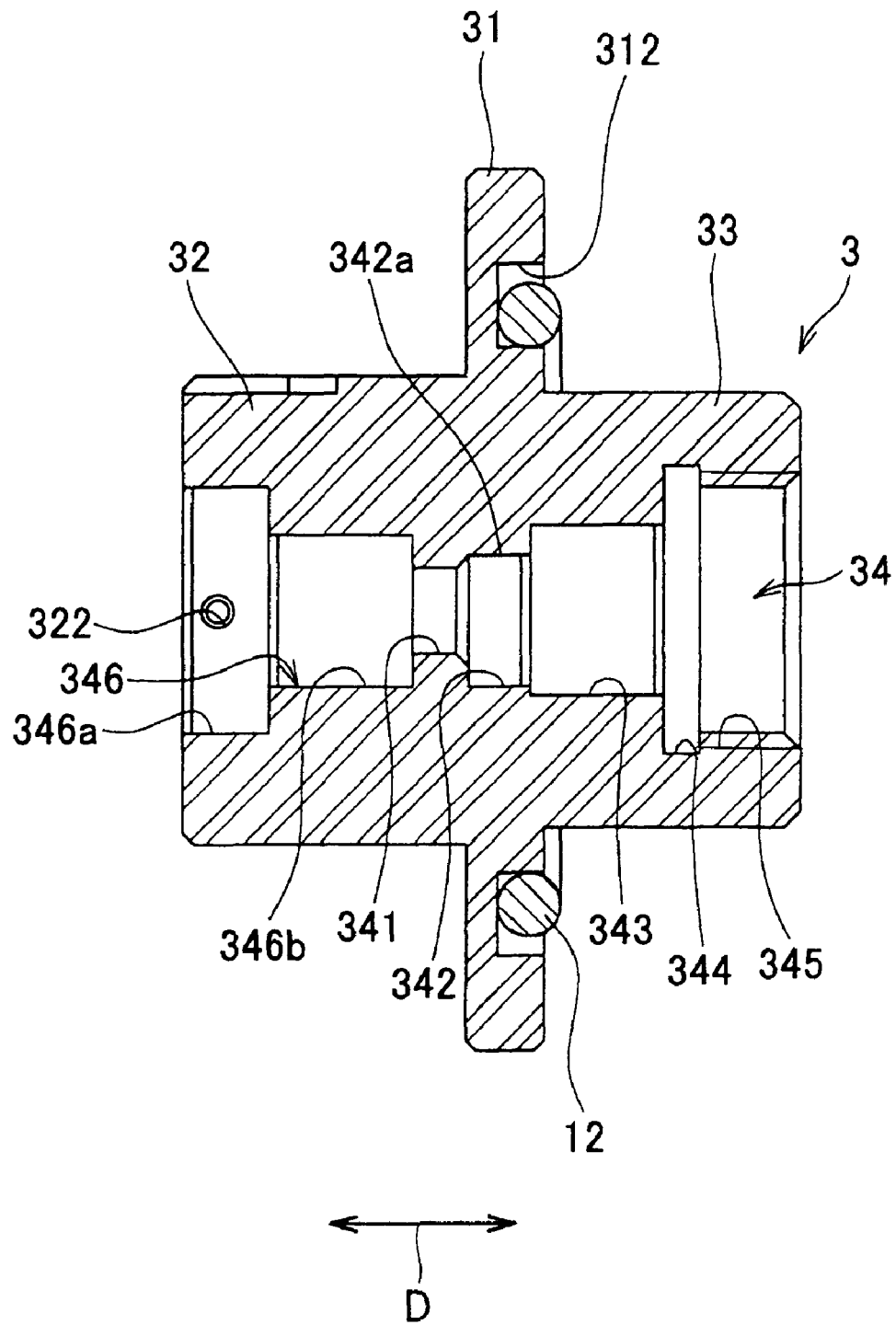
FIG. 6 is a cross-sectional view of the housing of the optical connector shown in FIG. 1.

As shown in FIGS. 4, 5, and 6, the housing 3 includes a plate-shaped portion 31, a hollow rectangular prism-shaped portion 32, and a hollow cylindrical portion 33.

The plate-shaped portion 31 has a rectangular shape, and has a screw insertion hole 311 formed in each corner thereof. A groove 312 is formed in a surface of the plate-shaped portion 31 toward the hollow cylindrical portion 33. When viewed from a rear side of the housing 3, the groove 312 encircles the hollow cylindrical portion 33 (see FIG. 5).

The hollow rectangular prism-shaped portion 32 is located on a front side of the plate-shaped portion 31. Two corner portions of the hollow rectangular prism-shaped portion 32 are each formed with a guide hole 321. The two guide holes 321 are located on the same diagonal line. A pin insertion hole 322 is formed in each side of the hollow rectangular prism-shaped portion 32 (see FIG. 4). A Pin 35 is inserted into each pin insertion hole 322 and is fixed to the hollow rectangular prism-shaped portion 32 (see FIG. 3). A key groove 323 is formed in an upper surface of the hollow rectangular prism-shaped portion 32 as viewed in FIG. 4.

The hollow cylindrical portion 33 is located on a rear side of the plate-shaped portion 31.

A through hole 34 is formed in a central portion of the housing 3. As shown in FIG. 6, the inner diameter of the through hole 34 is not uniform. The through hole 34 is comprised of a ferrule-holding portion 341, a flange-accommodating portion 342, a seal member-accommodating portion 343, an accommodating portion 344, a female screw portion 345, and a receiving portion 346. These portions 341, 342, 343, 344, 345, and 346 are disposed such that the receiving portion 346, the ferrule-holding portion 341, the flange-accommodating portion 342, the seal member-accommodating portion 343, the accommodating portion 344, and the female screw portion 345 are disposed in the mentioned order in a direction from a front side (left side as viewed in FIG. 6) to the rear side (right side as viewed FIG. 6) of the housing 3.

In a fitting/removing direction D of the housing 3 with respect to the optical adapter 20, the ferrule-holding portion 341 is located in a substantially intermediate position of the through hole 34. The inner diameter of the ferrule-holding portion 341 is smaller than that of any other portion (e.g. the flange-accommodating portion 342). The flange-accommodating portion 342 is continuous with a rear side of the ferrule-holding portion 341. The inner diameter of the flange-accommodating portion 342 is larger than the inner diameter of the ferrule-holding portion 341. A protruding portion 342a is formed on an inner peripheral surface of the flange-accommodating portion 342 (see FIG. 5). The seal member-accommodating portion 343 is continuous with a rear side of the flange-accommodating portion 342. The inner diameter of the seal member-accommodating portion 343 is larger than the inner diameter of the flange-accommodating portion 342. The accommodating portion 344 is continuous with a rear side of the seal member-accommodating portion 343. The inner diameter of the accommodating portion 344 is larger than the inner diameter of the seal member-accommodating portion 343. The female screw portion 345 is continuous with a rear side of the accommodating portion 344. The inner diameter of the female screw portion 345 is smaller than the inner diameter of the accommodating portion 344. The receiving portion 346 is continuous with a front side of the ferrule-holding portion 341. The receiving portion 346 includes a large-diameter portion 346a and a small-diameter portion 346b. The large-diameter portion 346a is located on a front side of the small-diameter portion 346b. The inner diameter of the large-diameter portion 346a is larger than the inner diameter of the small-diameter portion 346b.

As shown in FIG. 2, the insertion member 5 includes a pressing portion 51, a male screw portion 52, and an operating portion 53, and is inserted into the through hole 34 of the housing 3 except for the operating portion 53. The pressing portion 51 has a hollow cylindrical shape, and is inserted into the seal member-accommodating portion 343 when the male screw portion 52 is screwed into the female screw portion 345 of the through hole 34. The male screw portion 52 has a cylindrical shape and is continuous with a rear side of the pressing portion 51. The outer diameter of the male screw portion 52 is larger than the outer diameter of the pressing portion 51. The male screw portion 52 is screwed into the female screw portion 345. A through hole 54 is formed in a central portion of the insertion member 5.

Figure 7:
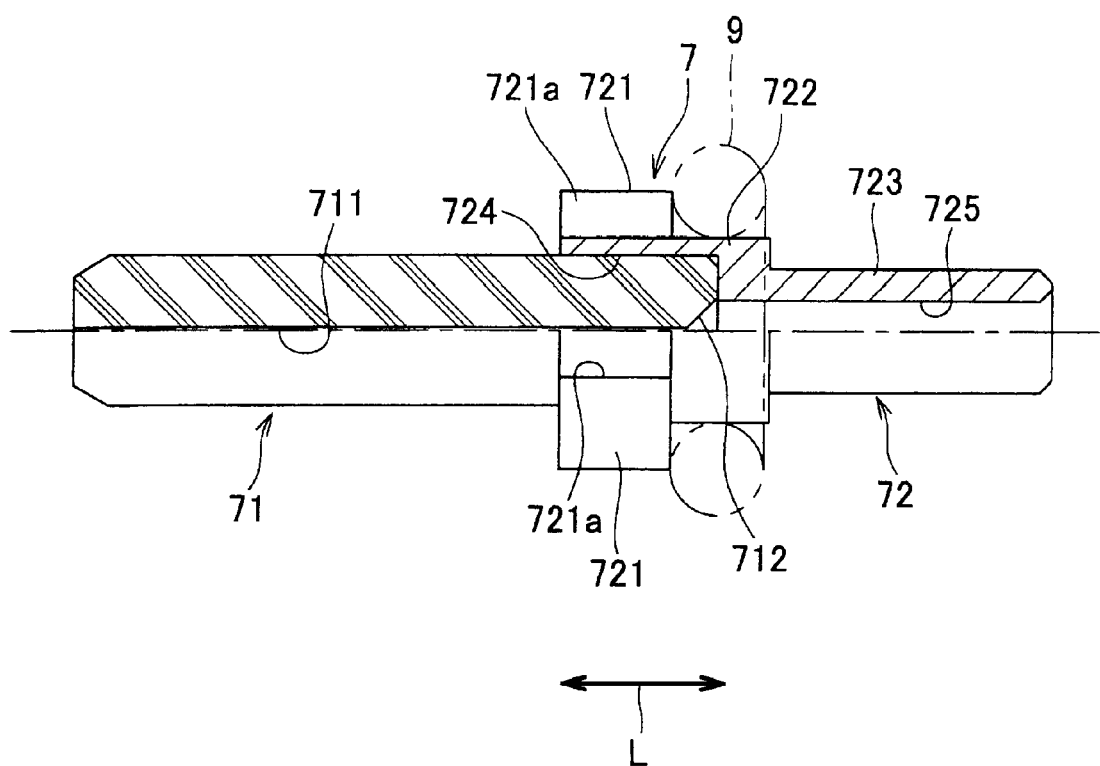
FIG. 7 is a fragmentary cross-sectional view of a holding member of the optical connector shown in FIG. 2.
Figure 8:
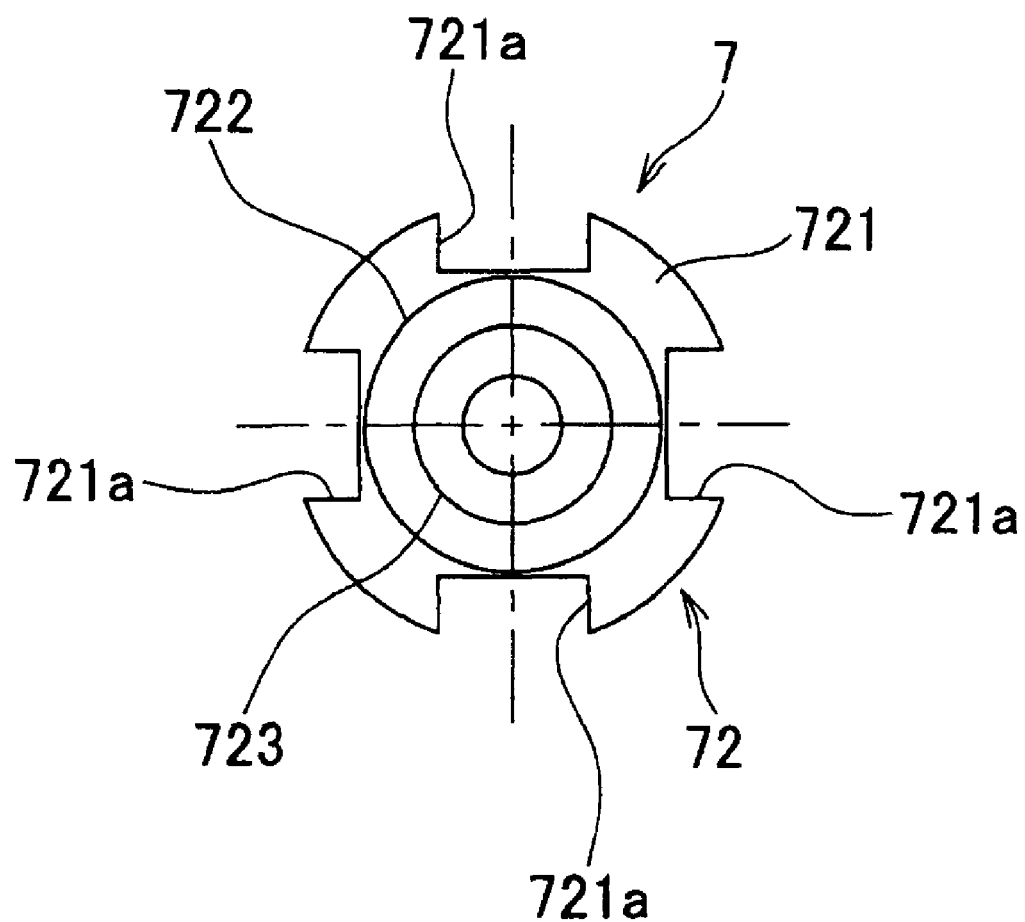
FIG. 8 is a rear view of the holding member shown in FIG. 7.

As shown in FIG. 2, the holding member 7 holds the optical fiber strand 191 and is accommodated in the through hole 34 of the housing 3. As shown in FIG. 7, the holding member 7 is comprised of a ferrule 71 and a flange member 72. In FIG. 7, the upper half of the holding member 7 is cut off.

The ferrule 71 is made of e.g. zirconia and has a substantially hollow cylindrical shape, as shown in FIG. 7. A holding hole 711 is formed in a central portion of the ferrule 71. The optical fiber strand 191 of the optical fiber code 19 is inserted into the holding hole 711, and is held by the ferrule 71. A tapered surface 712 is formed on a rear end portion of the ferrule 71. The tapered surface 712 is continuous with an inner peripheral surface of the holding hole 711. The tapered surface 712 guides the optical fiber strand 191 into the holding hole 711.

The flange member 72 is made of e.g. stainless steel and includes a flange portion 721, a large-diameter portion 722, and a small-diameter portion 723. Four recesses 721a are formed at equally-spaced intervals in an outer peripheral surface of the flange portion 721. The flange portion 721 is accommodated in the flange-accommodating portion 342 of the through hole 34 of the housing 3. At this time, the protruding portion 342a of the housing 3 is fitted to one of the four recesses 721a. By doing so, the holding member 7 is prevented from rotating. Also, by properly selecting one recess 721a from the four recesses 721a which is to be fitted to the protruding portion 342a, it is possible to adjust a position of the optical fiber strand 191 around an optical axis with respect to a mating optical fiber strand (not shown). The large-diameter portion 722 is continuous with a rear side of the flange portion 721. The outer diameter of the large-diameter portion 722 is smaller than the outer diameter of the flange portion 721. The small-diameter portion 723 is continuous with a rear side of the large-diameter portion 722. The outer diameter of the small-diameter portion 723 is smaller than the outer diameter of the large-diameter portion 722.

A large-diameter hole 724 and a small-diameter hole 725 are formed in a central portion of the flange member 72. The large-diameter hole 724 extends from a front end surface of the flange portion 721 to an intermediate location of the large-diameter portion 722 in a longitudinal direction L of the holding member 7. The large-diameter hole 724 receives a rear end portion of the ferrule 71. The rear end portion of the ferrule 71 is held by the large-diameter portion 722. The small-diameter hole 725 extends from the intermediate location of the large-diameter portion 722 to a rear end of the small-diameter portion 723 in the longitudinal direction L. The small-diameter hole 725 permits the optical fiber strand 191 of the optical fiber code 19 to pass through the holding hole 711 of the ferrule 71 and receives a front end portion of the secondary coating 192. The outer diameter of the small-diameter hole 725 is substantially the same as the outer diameter of the outer sheath 193 of the optical fiber code 19.

As shown in FIGS. 2 and 7, the seal member 9 is mounted on an outer peripheral surface of the large-diameter portion 722 of the flange member 72 and is brought into contact with the flange portion 721. The seal member 9 is formed of an elastic material such that it has a substantially ring shape, and is implemented e.g. by an O ring. The seal member 9 is accommodated in the seal member-accommodating portion 343 of the through hole 34 of the housing 3 in a state in which the seal member 9 is mounted on the large-diameter portion 722. At this time, the seal member 9 is sandwiched between the outer peripheral surface of the large-diameter portion 722 and an inner peripheral surface of the seal member-accommodating portion 343 to become compressed in a radial direction (the direction of the outer diameter) of the seal member 9.

As shown in FIG. 2, the sleeve 11 receives the small-diameter portion 723 of the flange member 72 and a front end portion of the outer sheath 193 of the optical fiber code 19 and couples the holding member 7 and the optical fiber code 19 to each other.

As shown in FIG. 2, the seal member 12 is accommodated in the groove 312 of the plate-shaped portion 31 of the housing 3 and seals between the plate-shaped portion 31 and the panel 17 when the plate-shaped portion 31 is fixed to the panel 17 with screws 18.

Figure 9:
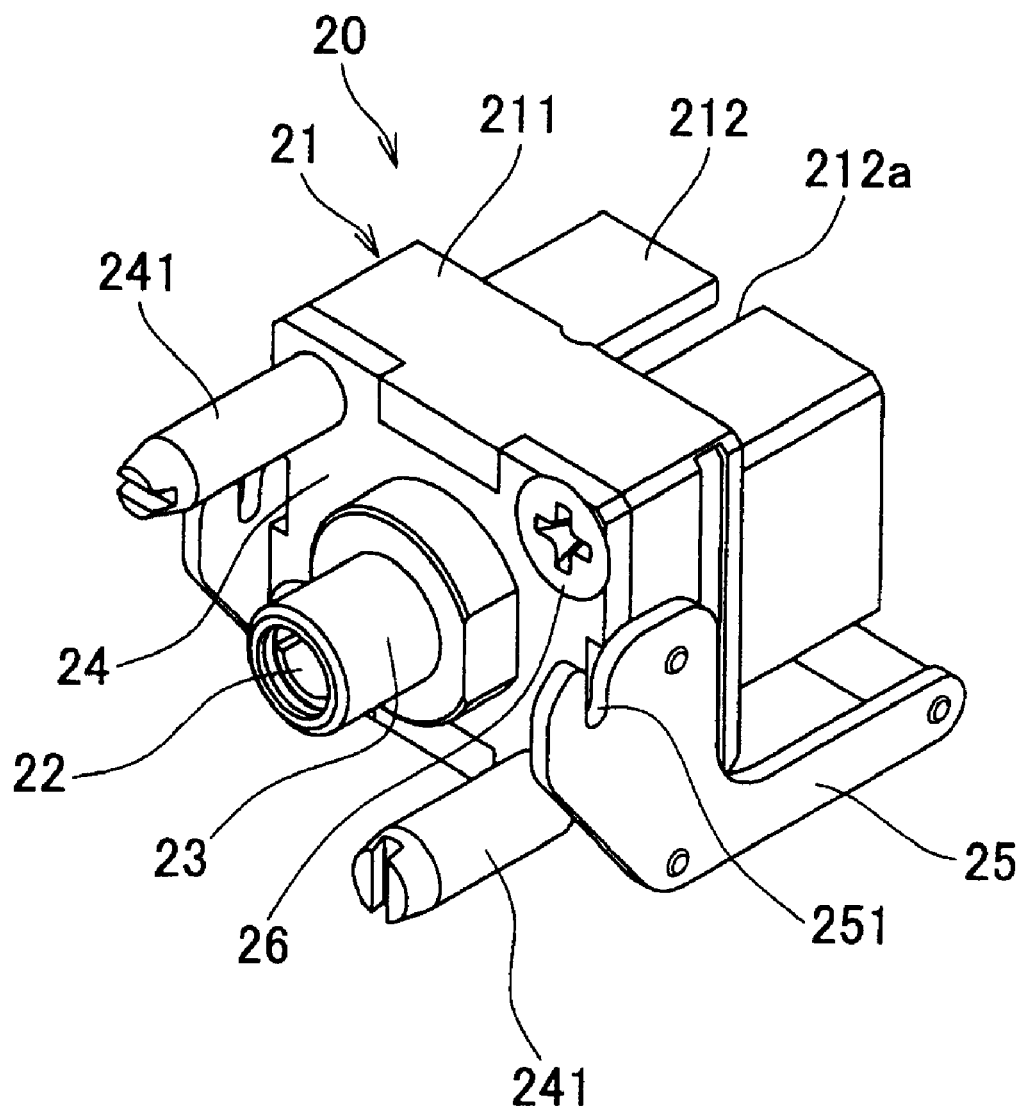
FIG. 9 is a perspective view of the optical adapter shown in FIG. 1.
Figure 10:
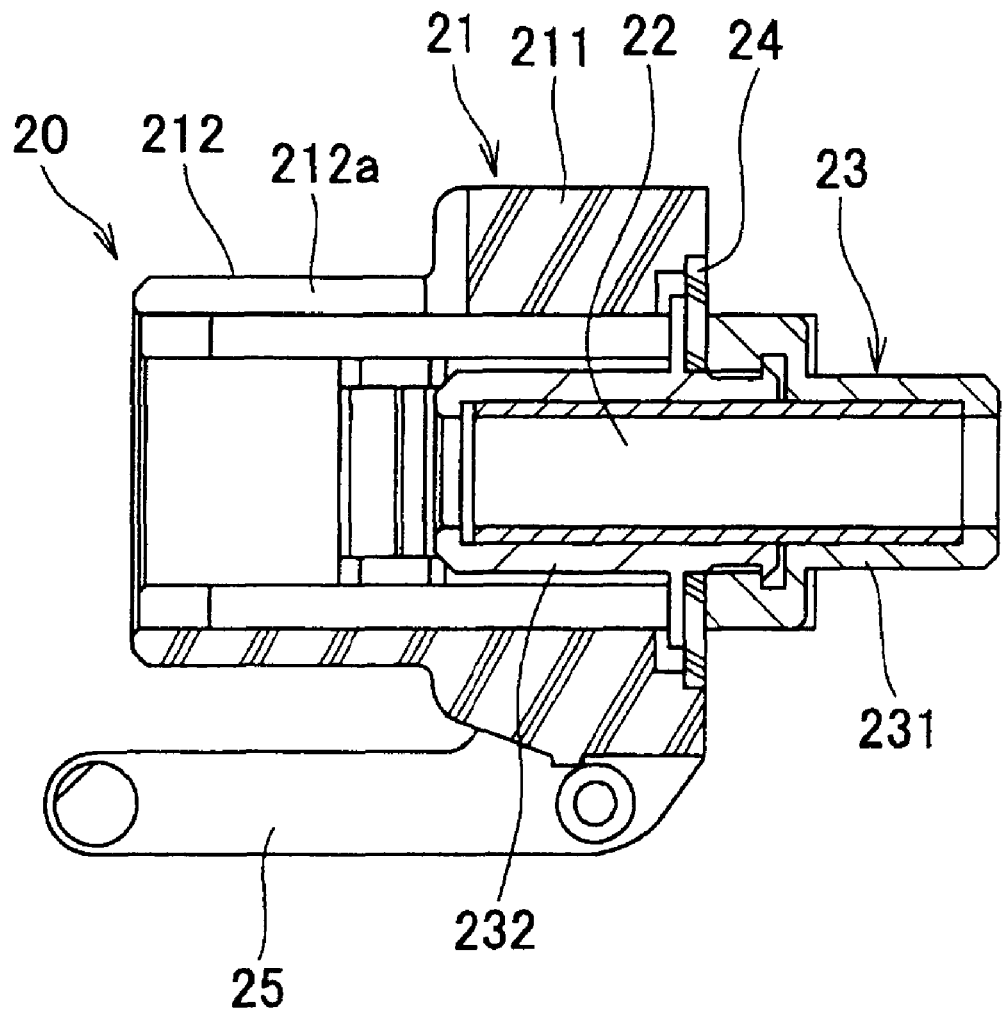
FIG. 10 is a cross-sectional view of the optical adapter shown in FIG. 9.

As shown in FIGS. 9 and 10, the optical adapter 20 includes a housing 21, a split sleeve 22, a sleeve holder 23, a plate 24, and levers 25.

The housing 21 includes a housing body 211 and a fitting portion 212. The fitting portion 212 is continuous with a rear surface of the housing body 211. A key groove 212a is formed in a top of the fitting portion 212. A mating optical connector 40 (see FIGS. 17 and 18) is fitted to the fitting portion 212.

The split sleeve 22 is accommodated in and held by the sleeve holder 23.

The sleeve holder 23 is comprised of a first holder member 231 and a second holder member 232.

The plate 24 is sandwiched between the first holder member 231 and the second holder member 232. The plate 24 is provided with a pair of guide pins 241. The guide pins 241 are inserted into the guide holes 321 (see FIG. 16) of the housing 3 of the optical connector 1. The plate 24 is fixed to a front surface of the housing body 211 with screws 26.

Each lever 25 is rotatably attached to the housing 21. The lever 25 has a hook portion 251 formed in a front end portion thereof. The hook portion 251 is hooked to an associated one of the pins 35 (see FIG. 16) of the optical connector 1. By doing so, the optical adapter 20 is locked to the optical connector 1.

Next, a description will be given of assembly of the optical connector 1 with reference to FIGS. 11 to 15. Although the optical adapter 20 is fitted to the housing 3 of the optical connector 1 in FIGS. 11 to 15, it is not necessary that the optical adapter 20 is fitted to the housing 3, when the holding member 7, the sleeve 11, the seal member 9, and the insertion member 5 are assembled to the housing 3.

Figure 11:
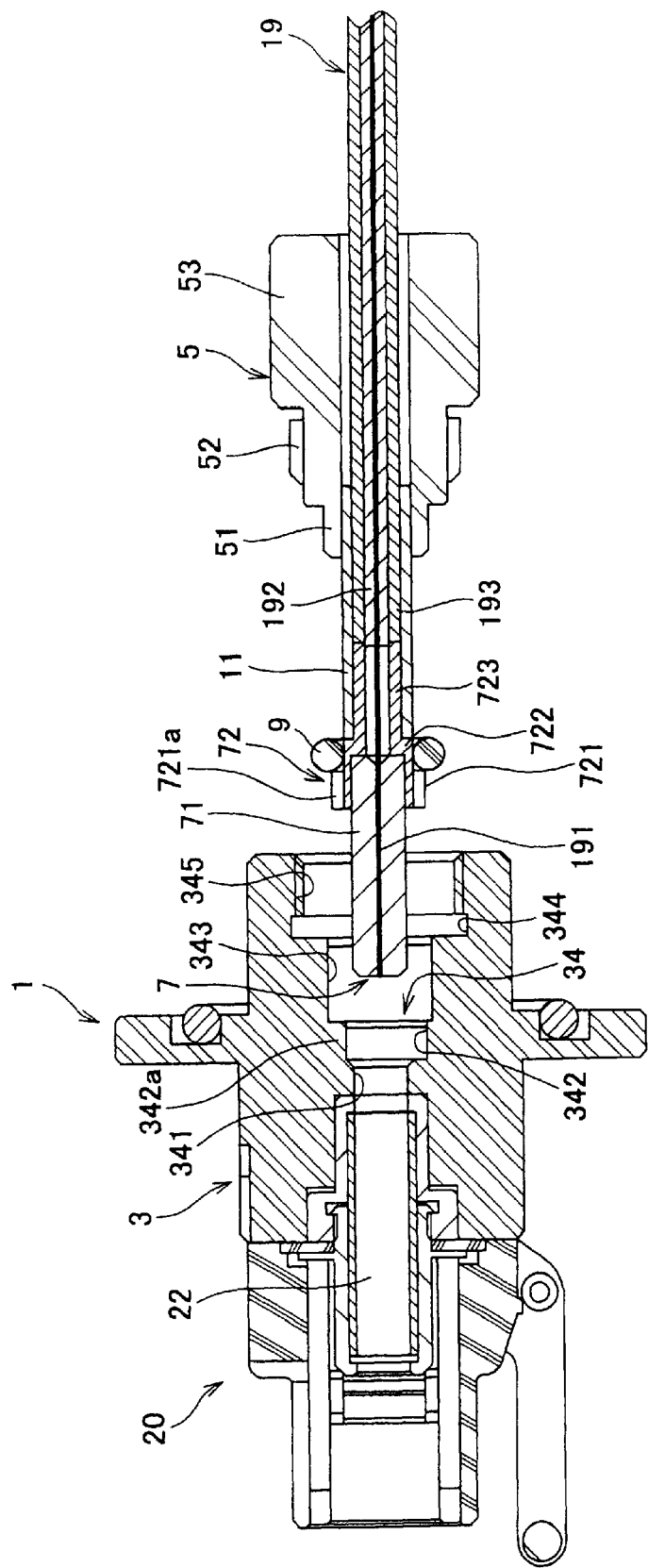
FIG. 11 is a cross-sectional view of the optical connector and the optical adapter in a state in which part of the holding member is inserted in the housing.

As shown in FIG. 11, first, after combining the flange member 72 having the seal member 9 mounted thereon with the ferrule 71, the optical fiber strand 191 of the optical fiber code 19 is inserted into the ferrule 71 via the flange member 72, and then the optical fiber strand 191 is bonded to the ferrule 71. In doing this, the optical fiber code 19 is passed through the insertion member 5 and the sleeve 11 in advance. Also, a front end of the outer sheath 193 of the optical fiber code 19 is brought into abutment with the rear end of the small-diameter portion 723 of the flange member 72.

Next, the sleeve 11 is moved until the sleeve 11 is brought into abutment with the large-diameter portion 722 of the flange member 72.

Figure 12:
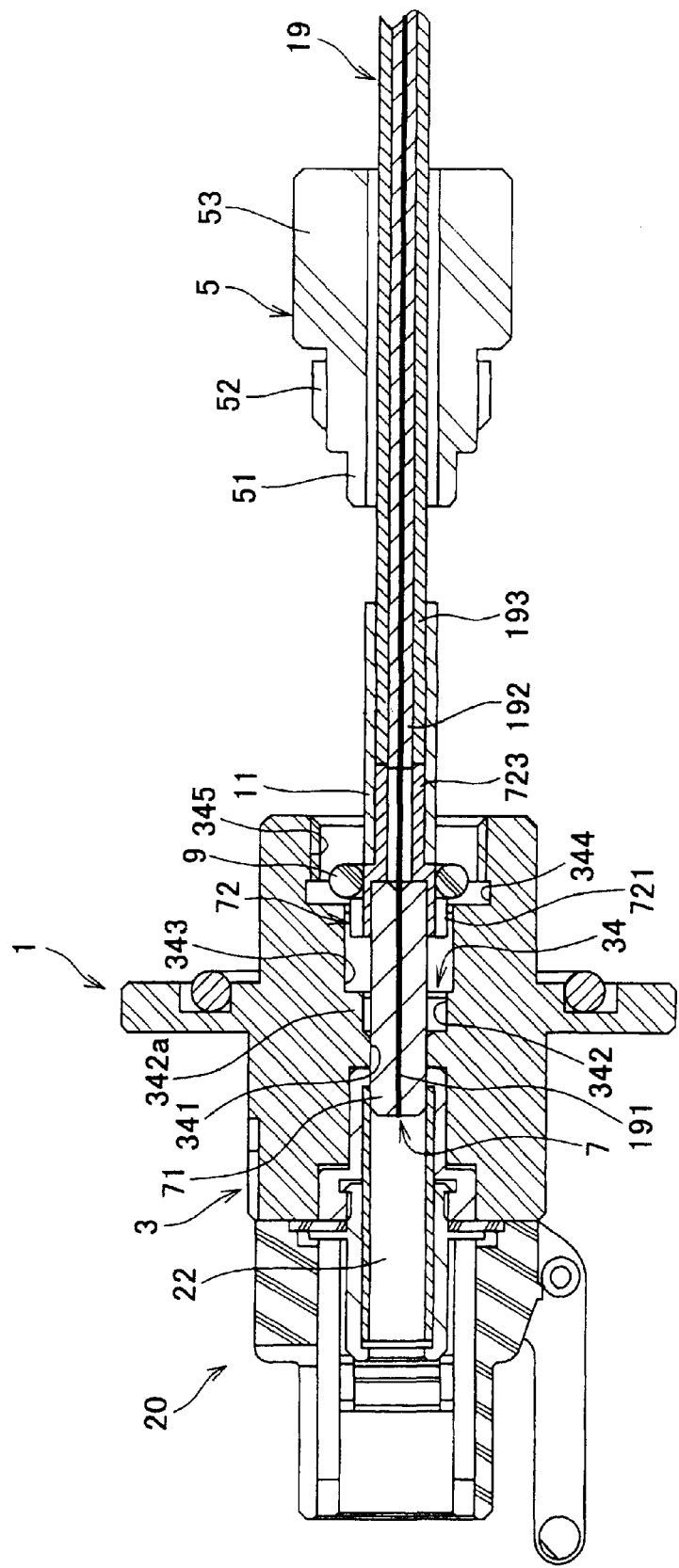
FIG. 12 is a cross-sectional view of the optical connector and the optical adapter in a state just before a seal member is received in a seal member-accommodating portion of the housing.

Then, by pinching the sleeve 11, as shown in FIG. 12, the sleeve 11 is inserted into the through hole 34 until the seal member 9 mounted on the flange member 72 is brought into abutment with a rear end of the seal member-accommodating portion 343 of the through hole 34 of the housing 3. At this time, since the ferrule 71 is inserted into the split sleeve 22 of the optical adapter 20, deflection of the ferrule 71 is suppressed.

Figure 13:
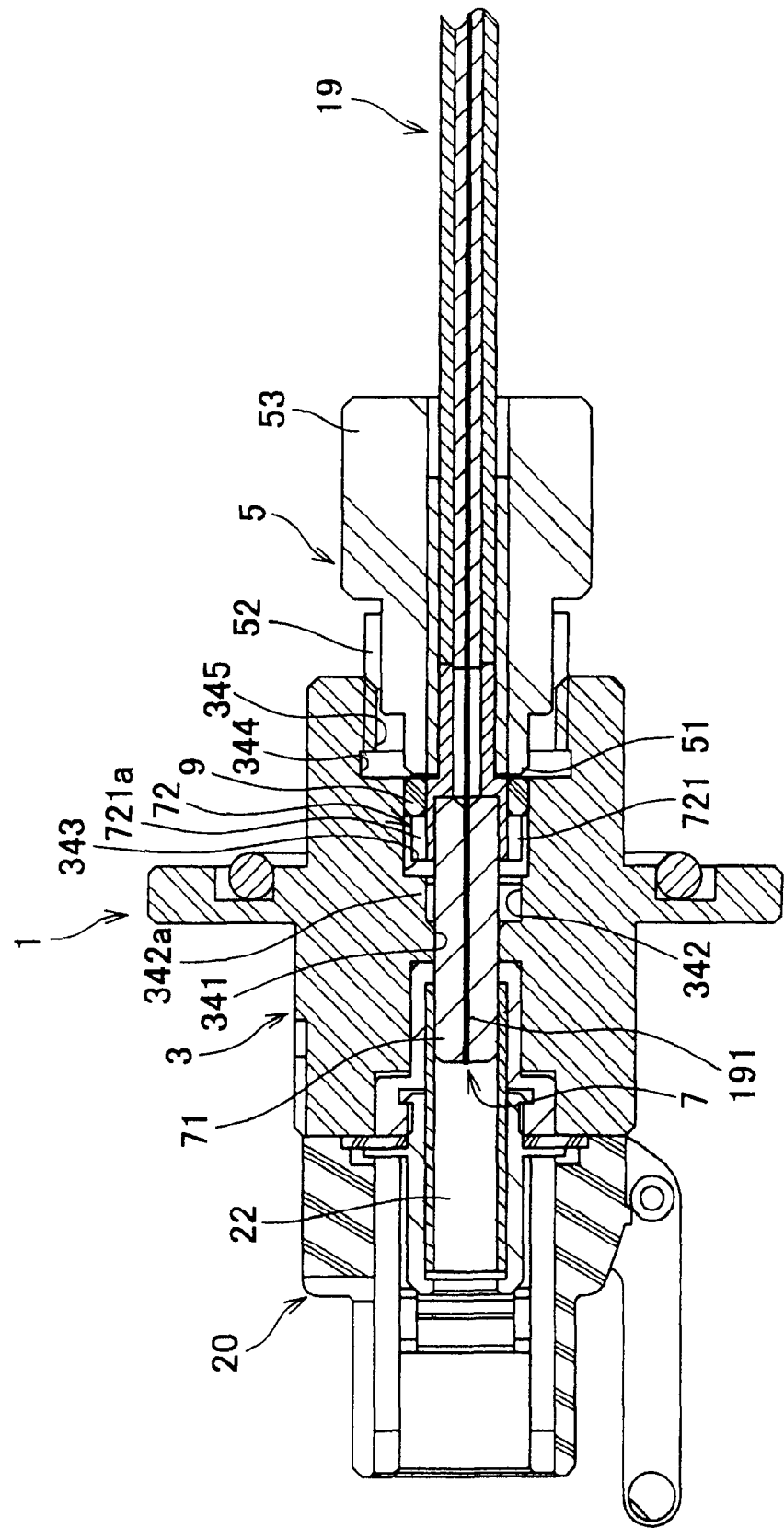
FIG. 13 is a cross-sectional view of the optical connector and the optical adapter in a state in which the seal member is accommodated in the seal member-accommodating portion of the housing.

Next, as shown in FIG. 13, the insertion member 5 is inserted into the through hole 34 until the male screw portion 52 of the insertion member 5 is brought into abutment with the female screw portion 345 of the through hole 34 (at this time, no action is taken to screw the insertion member 5 into the through hole 34). As a result, the seal member 9 is pressed into the seal member-accommodating portion 343 of the through hole 34 by the pressing portion 51 of the insertion member 5. The seal member 9 pressed into the seal member-accommodating portion 343 becomes compressed in the radial direction thereof, sealing the through hole 34.

Figure 14:
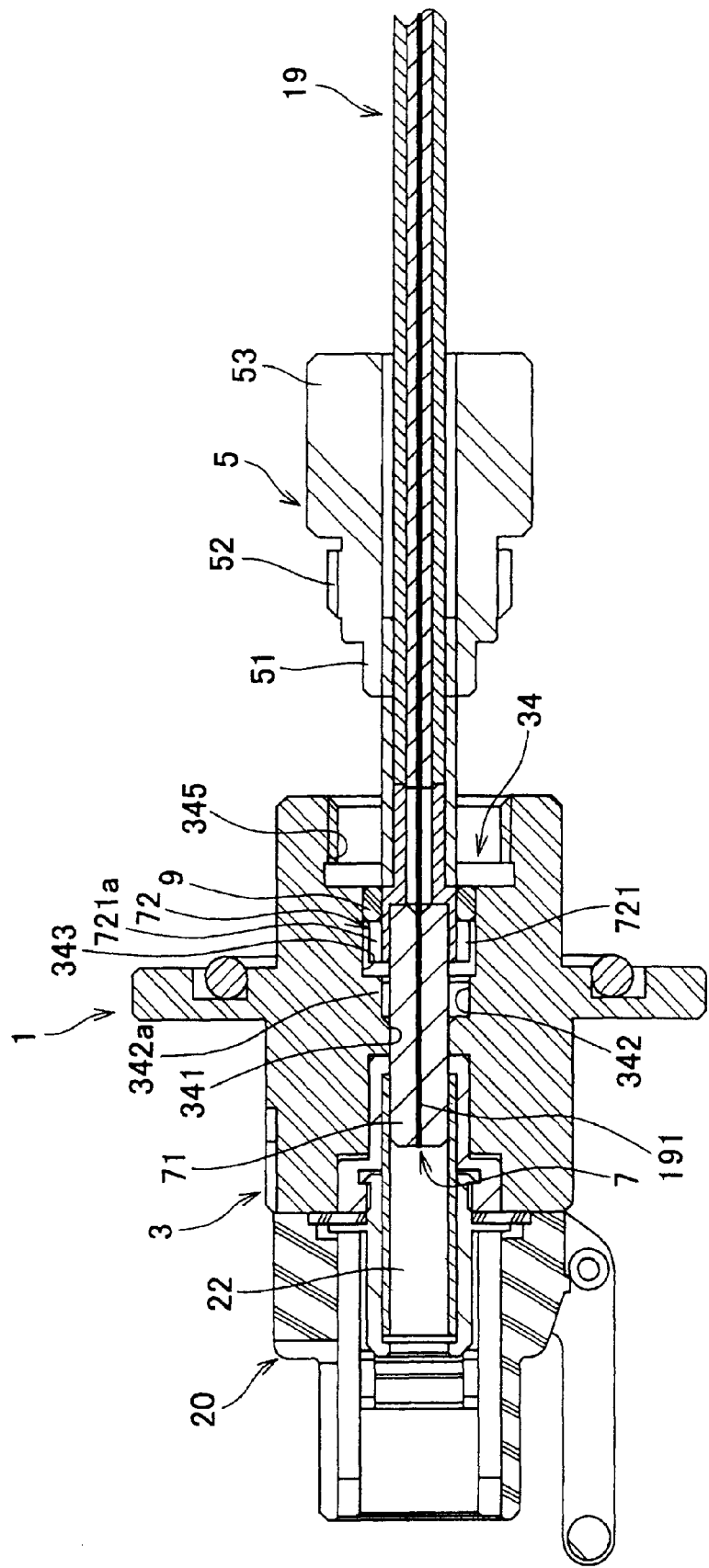
FIG. 14 is a cross-sectional view of the optical connector and the optical adapter in a state in which an insertion member is pulled out of the housing after the seal member is accommodated in the seal member-accommodating portion.

Then, as shown in FIG. 14, the insertion member 5 is pulled out of the through hole 34 once. As a result, the seal member 9 accommodated in the seal member-accommodating portion 343 can be seen from outside, thereby making it possible to confirm whether the seal member 9 is neither twisted nor broken.

Figure 15:
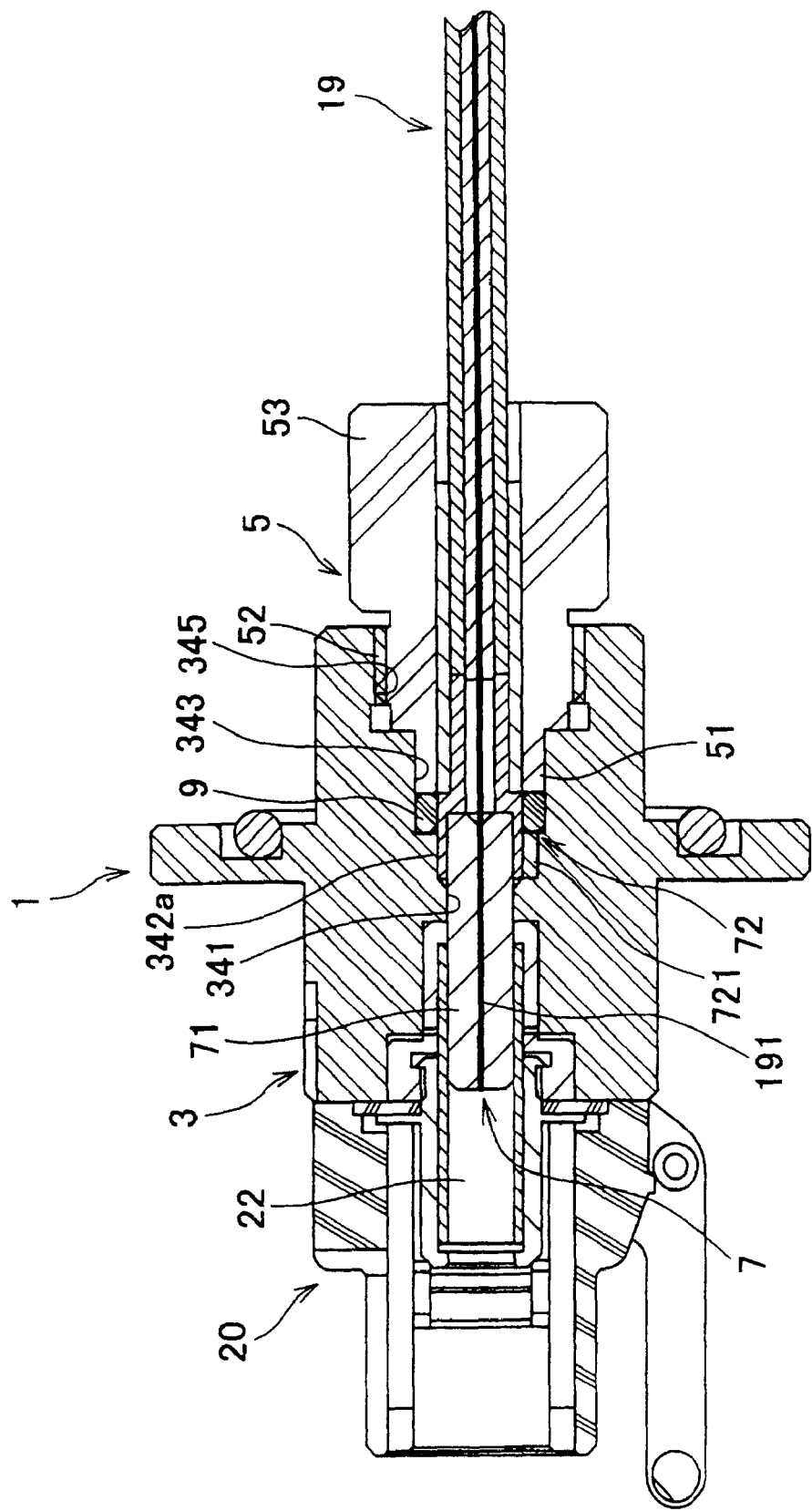
FIG. 15 is a cross-sectional view of the optical connector and the optical adapter in a state in which the insertion member is screwed into the housing.

Finally, as shown in FIG. 15, the insertion member 5 is inserted into the through hole 34 once again to screw the male screw portion 52 of the insertion member 5 into the female screw portion 345 of the housing 3. As a result, the seal member 9 is pressed by the pressing portion 51 of the insertion member 5 and moved frontward in the seal member-accommodating portion 343.

When through the above-described process, the assembly of the optical connector 1 is completed.

Next, a description will be given of an operation for connecting between the optical connector 1 and the mating optical connector 40 via the optical adapter 20 with reference to FIGS. 16 to 18.

Figure 16:
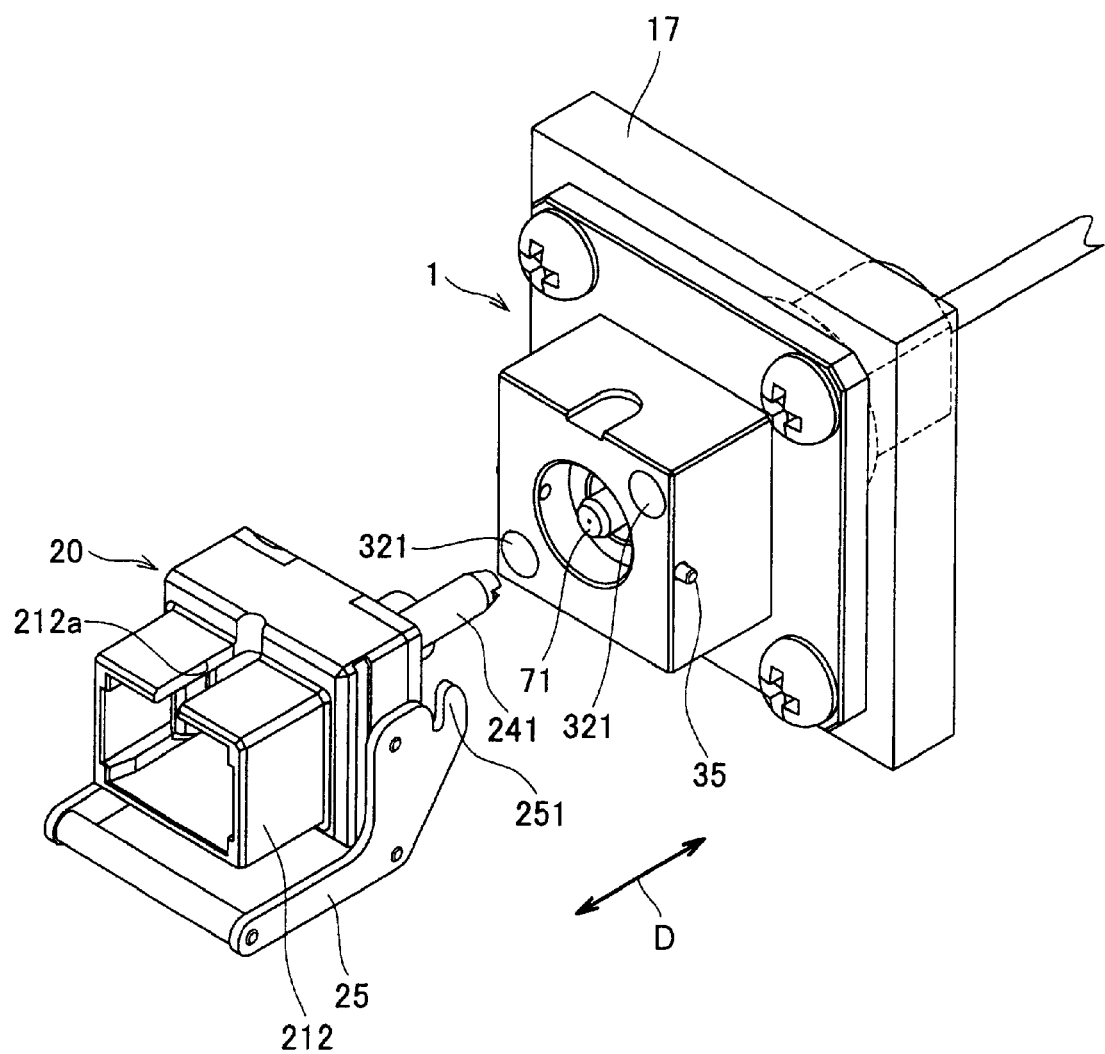
FIG. 16 is a perspective view of the optical connector and the optical adapter in a state before the optical adapter is connected to the optical connector.

As shown in FIG. 16, first, the optical adapter 20 is caused to face the optical connector 1 fixed to the panel 17, and the pair of guide pins 241 of the optical adapter 20 (in FIG. 16, only one guide pin 241 is shown) are inserted into the associated guide holes 321 of the optical connector 1, respectively. As a result, the split sleeve 22 of the optical adapter 20 (see FIG. 2) is guided in the fitting/removing direction D, and the ferrule 71 of the optical connector 1 is relatively inserted into the split sleeve 22. The ferrule 71 in the split sleeve 22 is positively held by the split sleeve 22.

Figure 17:
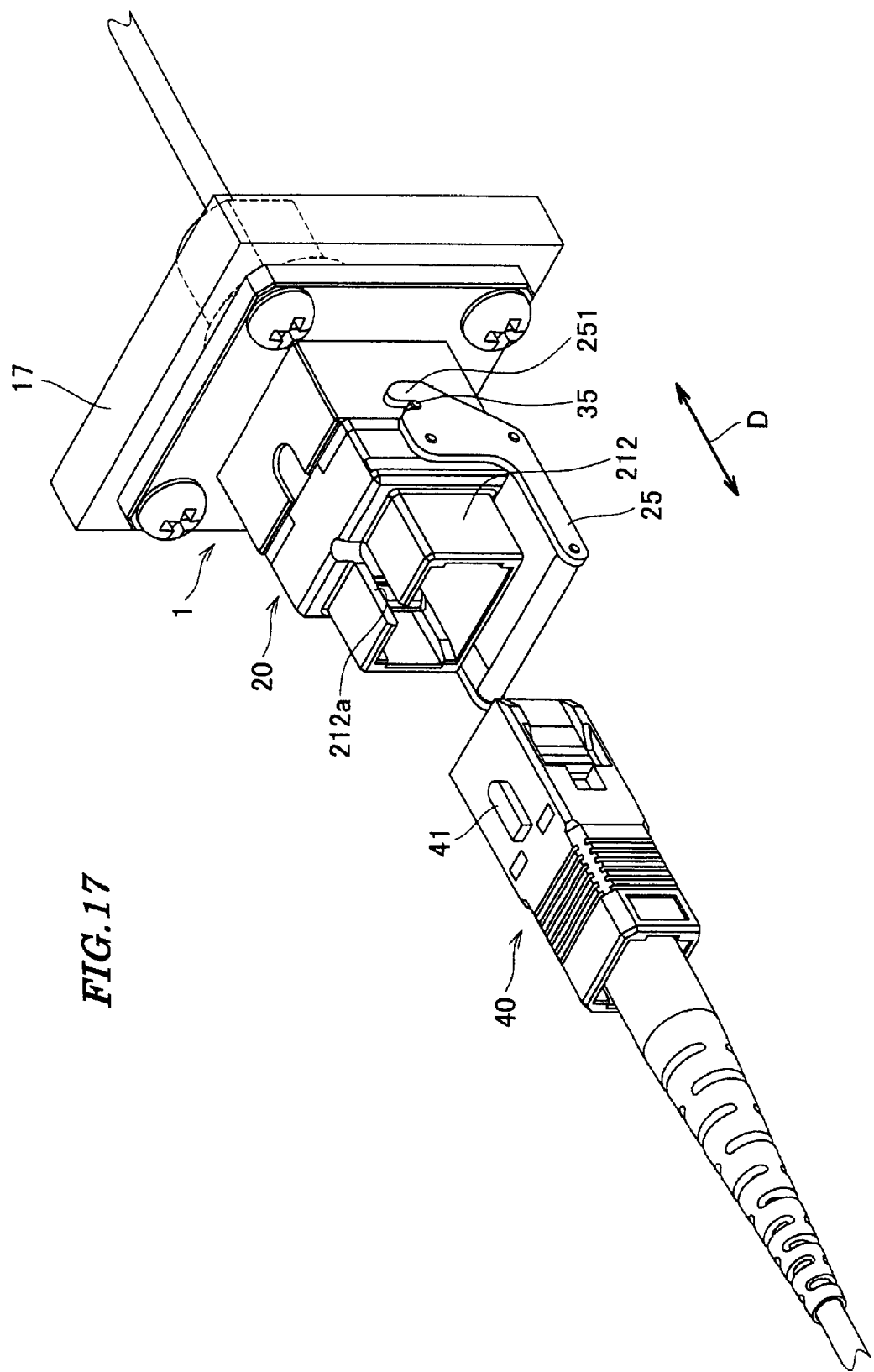
FIG. 17 is a perspective view of the optical connector and a mating optical connector in a state before the mating optical connector is connected to the optical adapter.
Figure 18:
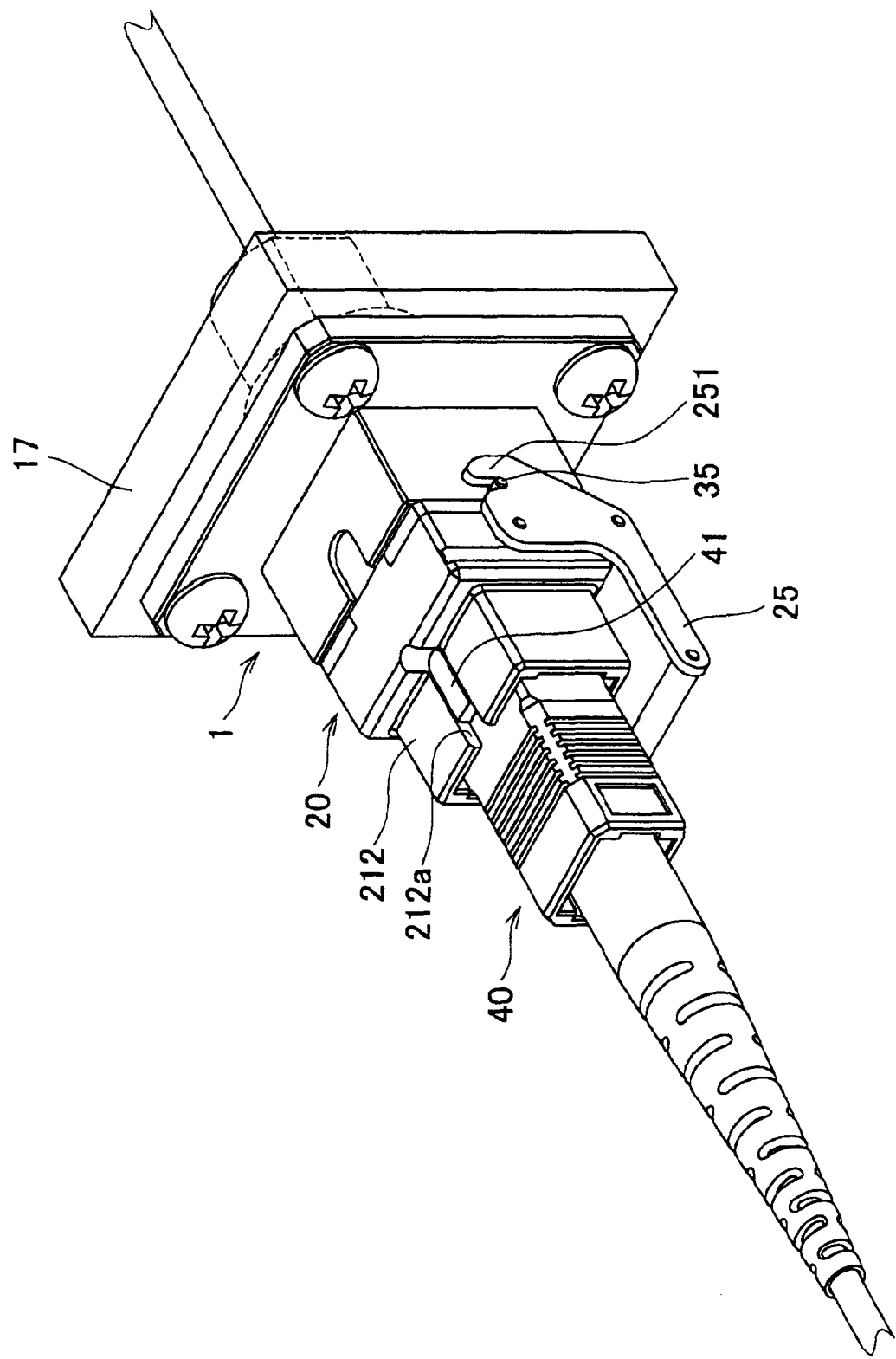
FIG. 18 is a perspective view of the optical connector and a mating optical connector in a state in which the mating optical connector is connected to the optical adapter.

Next, the lever 25 of the optical adapter 20 is rotated such that the hook portions 251 of the lever 25 are hooked to the pins 35 of the optical connector 1 to thereby fix the optical adapter 20 to the optical connector 1 (see FIG. 17).

Finally, as shown in FIG. 17, the mating optical connector 40 is caused to face the optical adapter 20, and is inserted into the fitting portion 212 of the optical adapter 20 in the fitting/removing direction D. At this time, as shown in FIG. 18, a key 41 of the mating optical connector 40 is inserted into the key groove 212a of the fitting portion 212 of the optical adapter 20. By doing so, abnormal fitting of the mating optical connector 40 and the optical adapter 20 is prevented.

By the above-described operation, the optical connector 1 and the mating optical connector 40 are connected to each other via the optical adapter 20.

According to the present embodiment, the seal member 9 is not compressed until the seal member 9 is pressed into the seal member-accommodating portion 343 as an intermediate portion of the through hole 34, i.e., it is not until the seal member 9 is pressed into the seal member-accommodating portion 343 that the seal member 9 is compressed. Therefore, damage to the seal member 9 is suppressed compared to the above-described related art where a seal member is compressed as soon as the seal member is inserted into the through hole of a housing, and is moved to a predetermined position (seal member-fixing position) while being rubbed against an inner peripheral surface of the through hole.

Also, after the seal member 9 is pressed into the seal member-accommodating portion 343, when the insertion member 5 is pulled out of the through hole 34, it is possible to confirm from outside with the eye whether the seal member 9 accommodated in the seal member-accommodating portion 343 is properly accommodated in the seal member-accommodating portion 343 and whether the seal member 9 is not damaged. At this time, since the insertion member 5 is not screwed into the through hole 34 yet, the insertion member 5 can be easily removed from the housing 3, whereby it is possible to quickly perform the confirmation operation on the seal member 9.

Further, since the optical connector 1 has the sleeve 11, the optical fiber strand 191 of the optical fiber code 19 can be inserted into the through hole 34 of the housing 3 by pinching the sleeve 11, whereby the optical fiber strand 191 is less likely to be damaged.

Also, since the insertion member 5 includes the operating portion 53, the insertion member 5 can be easily operated by operating the operating portion 53.

It should be noted that although in the above-described embodiment, the holding member 7 is formed of the ferrule 71 and the flange member 72, the holding member may be formed only of the ferrule.

Also, although the above-described insertion member 5 includes the operating portion 53 that protrudes from the through hole 34, the operating portion 53 that protrudes from the through hole 34 is not necessarily required.

It should be noted that although in the above-described embodiment, the ferrule 71 holds the optical fiber strand 191 (the ferrule 71 indirectly holds the optical fiber via the primary coating), the ferrule 71 may either directly hold the optical fiber or indirectly hold the optical fiber via the primary coating and the secondary coating 192.

It is further understood by those skilled in the art that the foregoing are the preferred embodiments of the present invention, and that various changes and modification may be made thereto without departing from the spirit and scope thereof.

What is claimed is:

1. An optical connector comprising:
   a housing including a through hole;
   an insertion member that is inserted into the through hole;
   a holding member that holds an optical fiber, the holding member being accommodated in the through hole; and
   a seal member that is mounted on an outer peripheral surface of said holding member, the seal member preventing fluid from passing through the through hole;
   wherein:
   a seal member-accommodating portion for accommodating said seal member in a compressed state is formed at an intermediate position in the through hole of said housing,
   said insertion member is provided with a pressing portion that presses said seal member into the seal member-accommodating portion when said insertion member is inserted into the through hole, and
   said holding member comprises a ferrule for holding said optical fiber and a flange member that is mounted on an insertion member-side end portion of said ferrule, the flange member including a flange portion for receiving said seal member when said insertion member is inserted into the through hole.

2. The optical connector as claimed in claim 1, wherein at least one recess is formed in an outer peripheral surface of said flange portion, and a protruding portion that is fittable to the recess is formed on an inner peripheral surface of the through hole.

3. The optical connector as claimed in claim 1, wherein said insertion member includes an operating portion that protrudes outside from the through hole when said insertion member is inserted into the through hole.

4. The optical connector as claimed in claim 2, wherein said insertion member includes an operating portion that protrudes outside from the through hole when said insertion member is inserted into the through hole.

* * * * *